United States Patent Office 3,513,294
Patented May 19, 1970

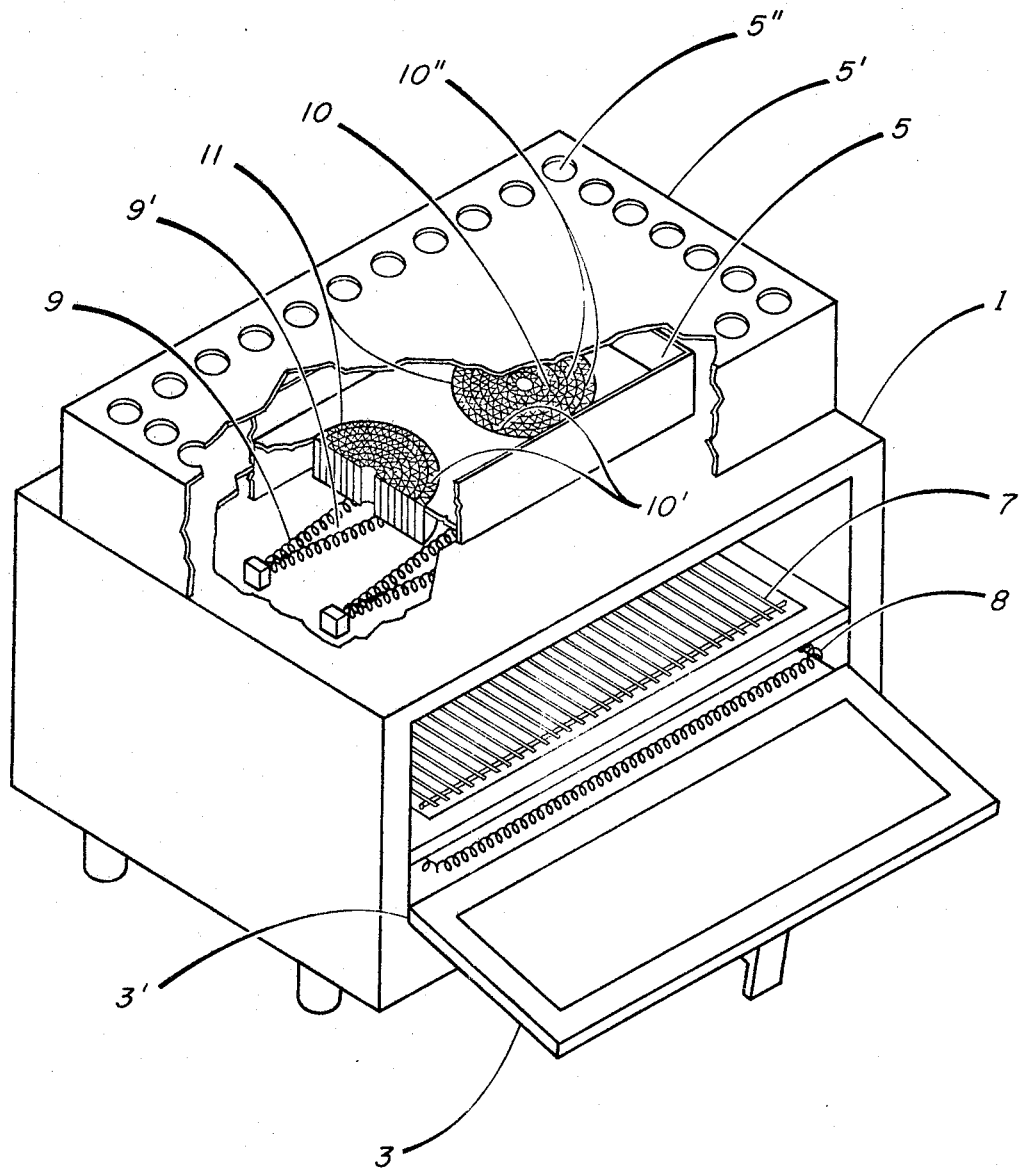

3,513,294
ELECTRIC COOKING OVEN
Peter A. Goolkasian, Concord, Mass., assignor to Prototech Company, a division of Bolt Beranek and Newman Inc., Cambridge, Mass., a corporation of Massachusetts
Filed Apr. 8, 1968, Ser. No. 719,661
Int. Cl. F27d *11/02*
U.S. Cl. 219—393                    4 Claims

ABSTRACT OF THE DISCLOSURE

An electric cooling oven for cooling food articles having electrical heating elements and a catalyst support disposed above said articles, said catalyst being heated by said heating elements. Air, carrying smoke and related uncombusted products from cooked food articles and heated by the heating elements is passed through openings in the heating elements and into the catalyst support, the air being then exhausted as a clean effluent stream.

---

The present invention relates to cooking ovens and more particularly to ovens employing catalytic removal devices for smoke and related uncombusted products. While being more specifically concerned with the cooking of food, the processes of the invention and apparatus herein described are also applicable to the heating of any kind of product which normally gives rise to the production of contaminated smoke and the like and to the purification of such smoke; the term "cooking" therefore being generically used herein to embrace all such heating processes.

It has previously been proposed to use catalytic beds and other catalytic configurations to purify smoke produced by the cooking of food or other items in ovens, ranges, and similar apparatus. A very successful catalytic unit of this type embodying substantially straight-through parallel paths bounded by catalytic material is described, for example in U.S. Letters Patent 3,206,334, issued Sept. 14, 1965. Such catalytic units require special mechanisms for producing a heat-radiating sheet for raising the temperature of the catalytic material to the region in which it can effectively oxidize the uncombusted products in the smoke or other exhaust, or the passage of electric current through heat-generating electrodes or heater coils for attaining a similar result; this heat-generating equipment being, in many instances, supplementary to the heating device used for the cooking of the food itself. In many ovens, moreover, it is required that the door to the oven be at least partially left open to provide an exit for the cooking smoke and to prevent the overheating of the article being cooked, or the ignition of the grease or other uncombusted products in the smoke. The use of catalytic devices in such cases is thus limited only to that portion of the smoke that passes through the catalytic support. It is, therefore, to the solution of the problem of simplifying the use of catalytic cleaners in ovens and the catalytic treatment of substantially all the smoke and other uncombusted products produced in a cooking oven, that the present invention is primarily directed.

An object of the invention, accordingly, is to provide a new and improved cooking oven that is not subject to the above-described limitations, but that, to the contrary, enables the cleaning of substantially all of the smoke associated with oven cooking and simplifies the structure required for the heating and operation of the catalytic unit.

In summary, this end is attained through the use of heating elements that not only heat the article-to-be-cooked from above, but heat the catalytic support as well, and permit the passage of the smoke through openings in the heating elements into the heated catalyst support and thence through the exhaust of the oven, and without the necessity for leaving the oven door open.

A further object is to provide a new and improved catalytic system.

Other and further objects will be explained hereinafter and are more particularly delineated in the appended claims.

The invention will now be described in connection with the accompanying drawing, the single feature of which is an isometric view of a preferred embodiment, with parts broken away in order to show details of construction.

Referring to the drawing, an oven is illustrated at 1 provided with front door 3 and an outlet exhaust opening 5 for the exhausting of hot air. The oven housing 1 is interiorly provided with a food-receiving tray 7 against which heat may be directed from above by heating-coil elements 9, shown disposed just below the exhaust opening 5.

In accordance with the invention, the same cooking coils 9 are used to provide a heat-radiating sheet for one or more catalytic supports 11, shown of the preferred form described in said Letters Patent, embodying a plurality of substantially parallel, continuous, juxtaposed open-ended, tubular cells 10, extending from a lower or input side adjacent the heating coils 9, in straight-through paths over a two-dimensional area, to an upper or output side that communicates with the exhaust outlet 5. The illustrated geometry is that of substantially concentrically arranged cells or cells of spiral configuration which may, for example, be formed by corrugated metal strips 10'. These cells may be of the type described in said Letters Patent having walls carrying appropriate catalytic materials, such as silver, nickel, palladium, platinum and the like, which at sufficiently elevated temperatures serve to oxidize uncombusted food products and the like. As explained in said Letters Patent, some of the cell walls 10" may be of insulating material (such as asbestos coated with catalyst), and the cell walls are preferably thin compared with the cross-dimensions of the cell, as illustrated, and of length substantially greater than the thickness of the walls. The heating elements 9 heat the catalyst support 11 over substantially its complete input end, with the before-mentioned heat-radiating sheet, generally at a temperature of the order of 300° C. and higher, and preferably in the 400°–500° C. range; the higher temperatures having been found to reduce cooking odors that would otherwise exhaust at 5, as well as oxidize the grease or other uncombusted products. Though the above-described and illustrated catalyst support is preferred for its low-pressure drop and other advantageous features, however, it is to be understood that other types of catalyst supports and catalyst beds may similarly be positioned and embodied in accordance with the principles of the invention.

In operation, it has been found possible, and, indeed, in most cases desirable, to cook upon the surface 7 in the oven 1 with the door 3 completely closed. Air circulation is achieved as a result of the introduction of some air through leaks 3' deliberately provided as at the corners or edges of the door 3. By spacing the heater 9 sufficiently close to the catalyst support 11 to obtain the above results and spacing the heater elements from one another such as to provide openings 9' therebetween that permit the free access of the hot air into the lower or input side of the catalyst support cells 10, several simultaneous highly desirable results occur.

First, in passing through the openings 9' in the heater 9, uncombusted products in the air-carried smoke become further burned and the remaining uncombusted products are then catalytically oxidized in passing through the catalyst cells 10, resulting in the exhausting at 5 of substantially celan hot air which, as before stated, may, indeed, be rendered substantially odorless by employing a sufficiently high temperature at the catalytic support 11. The resulting carbon dioxide and water that is exhausted, of course, are clean products. Because of this clean and odorless property, the exhausted hot air may be used for supplemental heating of food external to the the oven, as, for example, upon the lid 5' covering the exhaust outlet 5, the central portion of which lid is solid to prevent food products dropping onto the catalytic support 11, but peripherally perforated at 5" for exhausting the hot air. It is to be understood that more than one catalytic unit 11 may be used if desired, as shown, depending upon the geometry and size of the exhaust outlet 5.

A second and very important feature of the invention resides in the advantages of closed-door broiling; namely, a much more rapid, thorough, and uniform cooking of the food. Such cooking has, for example, been effected with a closed oven of the type shown in the drawing of about 7" x 14" x 10" in dimensions, employing a 3"-diameter catalytic unit 11 of the type described and illustrated, embodying corrugated 5-mil high-temperature nickel alloy cell walls 10', separated by palladized asbestos insulator wall strips 10", defining substantially triangular tubular cells 10, and heated to a temperature of about 425° C. (which was attained with heating coils 9 disposed about ½" below the catalytic support 11). Bacon, as an example, can be well cooked with the door closed in but three to four minutes, without substantial odor of bacon present at the exhaust outlet 5 and with no visible smoke.

If desired, particularly to take advantage of the self-basting, or similar action, that inherently occurs with closed-door broiling and heating from above, supplementary cooking of the food may simultaneously be effected from below the support tray or surface, as with the aid of an additional lower heater 8.

Further modifications will also occur to those skilled in the art, and all such are considered to fall within the spirit and scope of the invention as defined in the appended claims.

What is claimed is:

1. A cooking oven, having in combination, a housing provided interiorly with a surface for receiving articles to be cooked, a door for permitting access to the same and adapted to be closed, and an exhaust outlet, the housing having a leak for introduction of air when the door is closed; a catalyst support in said housing disposed between said surface and said exhaust outlet; electrical heating means forming a layer in said housing disposed between said catalyst support and said surface for producing a heat-radiating sheet for cooking said articles to be cooked and for heating said catalyst support, said heating means being provided with openings through which air may pass; said catalyst support comprising a multiplicity of air-flow paths bounded by catalytic material with the path inlets adjacent to said heating means for receiving air passed through the openings of said heating means and passing said air along said paths to said exhaust outlet; the air introduced by said leak carrying smoke and related uncombusted products from said surface supporting articles to be cooked through the said openings of the heating means to effect further burning of said products and then into and along the heated paths of the catalyst support, catalytically to oxidize the remainder of said products and to exhaust substantially clean, hot air from said outlet.

2. A cooking oven as claimed in claim 1 and in which said catalyst support comprises substantially straight, continuous, juxtaposed, substantially parallel, open-ended tubular cells disposed in a two-dimensional array providing substantially parallel straight-through paths extending from an input side thereof to an output side, the heating means comprising current-carrying heater elements defining said openings between portions thereof with said openings positioned to pass air therethrough into the cells at the said input side of the catalytic support and the said heater elements disposed to transfer heat into the cells simultaneously over substantially the entire area of said input side.

3. A cooking oven as claimed in claim 1 and in which there is provided further electrical heating means on the opposite side of said surface from the first-named heating means.

4. A cooking oven as claimed in claim 1 and in which said exhaust outlet is provided with a cover peripherally apertured for exhaust.

References Cited

UNITED STATES PATENTS

| | | | |
|---|---|---|---|
| 2,846,557 | 8/1958 | Schulze et al. | 219—267 |
| 2,862,095 | 11/1958 | Scofield | 219—393 |
| 3,032,635 | 5/1962 | Kraft | 219—553 X |
| 3,286,080 | 11/1966 | Lewis | 219—393 |
| 3,290,483 | 12/1966 | Hurko | 219—393 |
| 3,327,094 | 6/1967 | Martin et al. | 219—393 |
| 3,353,004 | 11/1967 | Alexander | 219—398 |

VOLODYMYR Y. MAYEWSKY, Primary Examiner

U.S. Cl. X.R.

126—19; 219—396, 478